United States Patent
Allain

(10) Patent No.: US 9,567,230 B2
(45) Date of Patent: Feb. 14, 2017

(54) METHOD FOR PREPARING PRECIPITATED SILICA

(75) Inventor: Emmanuelle Allain, L'Hay les Roses (FR)

(73) Assignee: Rhodia Operations, Aubervilliers (FR)

( * ) Notice: Subject to any disclaimer, the term of this patent is extended or adjusted under 35 U.S.C. 154(b) by 1101 days.

(21) Appl. No.: 13/394,320

(22) PCT Filed: Sep. 2, 2010

(86) PCT No.: PCT/EP2010/062864
§ 371 (c)(1),
(2), (4) Date: Jun. 26, 2012

(87) PCT Pub. No.: WO2011/026895
PCT Pub. Date: Mar. 10, 2011

(65) Prior Publication Data
US 2012/0263638 A1    Oct. 18, 2012

(30) Foreign Application Priority Data
Sep. 3, 2009  (FR) ...................................... 09 04179

(51) Int. Cl.
*C01B 33/193*    (2006.01)
(52) U.S. Cl.
CPC .................................. *C01B 33/193* (2013.01)
(58) Field of Classification Search
CPC .................................................... C01B 33/193
See application file for complete search history.

(56) References Cited

U.S. PATENT DOCUMENTS

| 7,250,463 | B2 | 7/2007 | Durel et al. | |
| 2005/0004297 | A1 | 1/2005 | Durel et al. | |
| 2005/0032965 | A1* | 2/2005 | Valero | 524/493 |
| 2010/0221541 | A1 | 9/2010 | Valero et al. | |
| 2011/0129401 | A1 | 6/2011 | Fournier et al. | |
| 2011/0178227 | A1* | 7/2011 | Allain et al. | 524/554 |

FOREIGN PATENT DOCUMENTS

| FR | 2928363 | * | 9/2009 | ........... C01B 33/193 |
| WO | WO 03/016215 | | 2/2003 | |
| WO | WO 03/016387 | | 2/2003 | |
| WO | WO 2008/077948 | | 7/2008 | |

OTHER PUBLICATIONS

International Search Report, dated Oct. 26, 2010 in related PCT Application No. PCT/IB2010/062864, filed on Sep. 2, 2010.

* cited by examiner

*Primary Examiner* — Melvin C Mayes
*Assistant Examiner* — Michael Forrest

(57) ABSTRACT

The invention relates to a method for preparing precipitated silica, consisting in: (i) forming a starter having a pH of between 2 and 5; (ii) simultaneously adding silicate and acid, such that the pH of the reaction medium is between 2 and 5; (iii) adding silicate until the pH is between 7 and 10; (iv) simultaneously adding silicate and acid, such that the pH is between 7 and 10; (v) adding acid until the pH is between 2.5 and 5.3; (vi) bringing the reaction medium into contact with the acid and the silicate, such that the pH is between 2.5 and 5.3; and (vii) adding silicate, such as to increase the pH to a value between 4.7 and 6.3.

18 Claims, No Drawings

METHOD FOR PREPARING PRECIPITATED SILICA

CROSS REFERENCE TO RELATED APPLICATIONS

The present application claims the benefit of PCT International Application No. PCT/EP 2010/062864 filed Sep. 2, 2010, which claims the benefit of French Application Serial No. 0904179 filed Sep. 3, 2009; each of which are incorporated herein by reference in their entireties.

The present invention relates to a novel process for preparing precipitated silica.

It is known practice to use precipitated silicas as catalyst supports, as absorbents for active materials (in particular liquid supports, for example used in food, such as vitamins (especially vitamin E), choline chloride), as viscosity enhancers, texturizers or anticaking agents, as battery separator components, and as toothpaste or paper additives.

Precipitated silicas may also be used as reinforcing fillers in silicone matrices (for example for coating electrical cables) or in compositions based on polymer(s), especially elastomer(s).

The aim of the present invention is to propose a novel process for preparing precipitated silica, which constitutes an alternative to the known processes for preparing precipitated silica, the precipitated silica obtained preferably having atypical characteristics.

Thus, one subject of the invention is a novel process for preparing precipitated silica, comprising the reaction of a silicate with an acidifying agent, via which a silica suspension is obtained, followed by the separation and drying of this suspension, characterized in that the reaction of the silicate with the acidifying agent is performed according to the following successive steps:

(i) an aqueous feedstock with a pH of between 2 and 5 and preferably between 2.5 and 5 is formed, (ii) silicate and acidifying agent are added simultaneously to said feedstock, such that the pH of the reaction medium is maintained between 2 and 5 and preferably between 2.5 and 5, (iii) the addition of the acidifying agent is stopped while continuing the addition of silicate to the reaction medium until a pH value obtained in the reaction medium is between 7 and 10 and preferably between 7.5 and 9.5, (iv) silicate and acidifying agent are simultaneously added to the reaction medium, such that the pH of the reaction medium is maintained between 7 and 10 and preferably between 7.5 and 9.5, (v) the addition of the silicate is stopped while continuing the addition of the acidifying agent to the reaction medium until a pH value obtained in the reaction medium is between 2.5 and 5.3 and preferably between 2.8 and 4.9, (vi) the reaction medium obtained after step (v) (thus having a pH of between 2.5 and 5.3 and preferably between 2.8 and 4.9) is placed in contact (mixed) with the acidifying agent and the silicate, such that the pH of the reaction medium is maintained between 2.5 and 5.3 and preferably between 2.8 and 4.9, (vii) an alkaline agent, preferably silicate, is added to the reaction medium obtained, so as to increase the pH of the reaction medium to a value of between 4.7 and 6.3 and preferably between 5.0 and 5.8, this step (vii) possibly being optional in the case where, in step (vi), a reaction medium (obtained after step (v)) with a pH of between 5.0 and 5.3 is placed in contact (mixed) with the acidifying agent and the silicate, such that the pH of the reaction medium (obtained by this placing in contact) is maintained between 5.0 and 5.3.

Very preferably, the process according to the invention always comprises step (vii).

In the process according to the invention, the choice of the acidifying agent, the alkaline agent and the silicate is made in a manner known per se.

A strong mineral acid such as sulfuric acid, nitric acid or hydrochloric acid, or an organic acid such as acetic acid, formic acid or carbonic acid, is generally used as acidifying agent.

The acidifying agent may be dilute or concentrated; its normality may be between 0.4 and 36 N, for example between 0.6 and 1.5 N.

In particular, in the case where the acidifying agent is sulfuric acid, its concentration may be between 40 and 180 g/L, for example between 60 and 130 g/L.

Any common form of silicate may moreover be used as silicate, such as metasilicates, disilicates and advantageously an alkali metal silicate, especially sodium or potassium silicate.

The silicate may have a concentration (expressed as $SiO_2$) of between 40 and 330 g/L, for example between 60 and 300 g/L and in particular between 60 and 260 g/L.

In general, sulfuric acid is used as acidifying agent and sodium silicate is used as silicate.

In the case where sodium silicate is used, it generally has an $SiO_2/Na_2O$ weight ratio of between 2.5 and 4, for example between 3.2 and 3.8.

The alkaline agent used in step (vii) may be, for example, a sodium hydroxide, potassium hydroxide or ammonia solution. Preferably, this alkaline agent is silicate, in particular silicate as used in the proceeding steps.

As more particularly regards the preparation process of the invention, the reaction of the silicate with the acidifying agent takes place in a very specific manner according to the following steps.

An aqueous feedstock with a pH of between 2 and 5 is first formed (step (i)).

Preferably, the feedstock formed has a pH of between 2.5 and 5 and especially between 3 and 4.6; this pH is, for example between 3.5 and 4.5.

This initial feedstock may be obtained (preferred variant) by adding acidifying agent to water so as to obtain a pH value of the feedstock of between 2 and 5, preferably between 2.5 and 5, especially between 3 and 4.6, for example between 3.5 and 4.5.

It may also be obtained by adding acidifying agent to a water+silicate mixture so as to obtain this pH value.

It may also be prepared by adding acidifying agent to a feedstock containing silica particles preformed at a pH below 7, so as to obtain a pH value of between 2 and 5, preferably between 2.5 and 5, especially between 3 and 4.6, for example between 3.5 and 4.5.

The feedstock formed in step (i) may optionally comprise an electrolyte. However, preferably, no electrolyte is added during the preparation process, in particular in step (i).

The term "electrolyte" is understood here in its generally accepted meaning, i.e. it means any ionic or molecular substance which, when it is in solution, decomposes or dissociates to form ions or charged particles. A salt from the group of alkali metal and alkaline-earth metal salts may be mentioned as electrolyte, especially the salt of the starting silicate metal and of the acidifying agent, for example sodium chloride in the case of the reaction of a sodium silicate with hydrochloric acid, or, preferably, sodium sulfate in the case of the reaction of a sodium silicate with sulfuric acid.

The second step (step (ii)) consists of a simultaneous addition of acidifying agent and silicate, such that (in particular at rates such that) the pH of the reaction medium is between 2 and 5, preferably between 2.5 and 5, especially between 3 and 5, for example between 3.5 and 4.8.

This simultaneous addition is advantageously performed such that the pH value of the reaction medium is close and preferably constantly equal (to within ±0.2) to that reached after the initial step (i).

Next, in a step (iii), the addition of the acidifying agent is stopped while continuing the addition of silicate to the reaction medium so as to obtain a pH value of the reaction medium of between 7 and 10, preferably between 7.5 and 9.5, for example between 7.5 and 9.

Maturation of the reaction medium may optionally be performed just after this step (iii) and thus just after stopping the addition of silicate, especially at the pH obtained after step (iii), and in general with stirring; this maturation may last, for example, from 2 to 45 minutes, in particular from 5 to 25 minutes, and preferentially comprises neither any addition of acidifying agent nor addition of silicate.

After step (iii) and the optional maturation, a further simultaneous addition of acidifying agent and silicate is performed, such that (in particular at rates such that) the pH of the reaction medium is maintained between 7 and 10, preferably between 7.5 and 9.5, for example between 7.5 and 9 (step (iv)).

This second simultaneous addition is advantageously performed such that the pH value of the reaction medium is constantly equal (to within ±0.2) to that reached after the preceding step.

It should be noted that, between step (iii) and step (iv), for example between, on the one hand, the optional maturation after step (iii), and, on the other hand, step (iv), acidifying agent may be added to the reaction medium, the pH of the reaction medium after this addition of acidifying agent being, however, between 7 and 9.5, preferably between 7.5 and 9.5, for example between 7.5 and 9.

Next, in a step (v), the addition of the silicate is stopped while continuing the addition of acidifying agent to the reaction medium, so as to obtain a pH value of the reaction medium of between 2.5 and 5.3, preferably between 2.8 and 4.9, for example between 2.9 and 4.5 (or even between 3.5 and 4.4).

Just after this step (v), maturation of the reaction medium may optionally be performed, especially at the pH obtained after step (v), and in general with stirring; this maturation may last, for example, from 2 to 45 minutes and in particular from 5 to 20 minutes, and may preferentially comprise neither any addition of acidifying agent nor addition of silicate.

Next, the following are placed in contact (step (vi)):
the reaction medium obtained after step (v), said reaction medium having a pH of between 2.5 and 5.3, preferably between 2.8 and 4.9, for example between 2.9 and 4.5 (or even between 3.5 and 4.4),
with acidifying agent and silicate, such that (in particular at rates such that) the pH of the reaction medium obtained is maintained between 2.5 and 5.3, preferably between 2.8 and 4.9, for example between 2.9 and 4.5 (or even between 3.5 and 4.4).

Said pH of the reaction medium may vary within the range 2.5-5.3, preferably within the range 2.8-4.9, for example within the range 2.9-4.5 (or even 3.5-4.4), or, preferably, may remain (substantially) constant within these ranges.

In general, in this step (vi), the placing in contact of the reaction medium obtained from step (v) with the acidifying agent and the silicate is performed by adding acidifying agent and silicate to said reaction medium.

According to one variant of the process of the invention, in step (vi), acidifying agent is first added to said reaction medium, followed by the silicate.

However, according to a preferred variant of the process of the invention, in step (vi), the acidifying agent and the silicate are rather added simultaneously to said reaction medium; preferably, this simultaneous addition is performed with regulation of the pH of the reaction medium obtained during this addition to a value that is (substantially) constant within the abovementioned ranges.

Step (vi) is generally performed with stirring.

Finally, step (vii) of the process according to the invention consists of an addition to the reaction medium obtained after step (vi) of an alkaline agent, preferably silicate, until a pH value of the reaction medium is between 4.7 and 6.3, preferably between 5.0 and 5.8, for example between 5.0 and 5.4.

This seventh step is optional (i.e. it is possibly not performed) in the case where, in step (vi), a reaction medium (obtained after step (v)) with a pH of between 5.0 and 5.3 is placed in contact (mixed) with the acidifying agent and the silicate, such that the pH of the reaction medium is maintained between 5.0 and 5.3.

Very preferably, the process according to the invention always comprises step (vii).

Step (vii) is usually performed with stirring.

In general, the entire reaction (steps (i) to (vii)) is performed with stirring.

All the steps (i) to (vii) are usually performed between 75 and 97° C. and preferably between 80 and 96° C.

According to one variant of the process of the invention, the steps are all performed at a constant temperature.

According to another variant of the process of the invention, the reaction end temperature is higher than the reaction start temperature: thus, the temperature at the start of the reaction (for example during steps (i) and (ii)) is maintained preferably between 75 and 90° C., and the temperature is then increased, preferably up to a value of between 90 and 97° C., at which value it is maintained (for example during steps (iii) to (vii)) until the end of the reaction.

It may be advantageous after step (vii) to perform maturation of the reaction medium obtained, especially at the pH obtained after this step (vii), and in general with stirring. This maturation may last, for example, from 2 to 30 minutes and in particular from 3 to 20 minutes, and may be performed between 75 and 97° C. and preferably between 80 and 96° C., in particular at the temperature at which step (vii) was performed. It preferentially comprises neither any addition of acidifying agent nor any addition of silicate.

In the process according to the invention, step (vi) may be performed in a rapid mixer or in a turbulent flow zone, which may allow better control of the characteristics of the precipitated silicas obtained.

For example, in the case where, in step (vi), the acidifying agent is first added to the reaction medium obtained after step (v), followed by the silicate, then the placing in contact of said silicate with the medium resulting from the addition of the acidifying agent to the reaction medium obtained after step (v) may be performed in a rapid mixer or in a turbulent flow zone.

Similarly, in the case where, in step (vi), the acidifying agent and the silicate are added simultaneously to the reaction medium obtained after step (v), then the placing in contact of said acidifying agent and of said silicate with said reaction medium may be performed in a rapid mixer or in a turbulent flow zone.

Preferably, the reaction medium obtained in the rapid mixer or in a turbulent flow zone feeds a reactor, which is preferably subjected to stirring, in which reactor step (vii) is then performed.

In step (vi), a rapid mixer chosen from symmetrical T or Y mixers (or tubes), asymmetric T or Y mixers (or tubes), tangential-jet mixers; Hartridge-Roughton mixers, vortex mixers or rotor-stator mixers may be used.

The symmetrical T or Y mixers (or tubes) are generally formed from two opposite tubes (T-shaped tubes) or tubes forming an angle of less than 180° (Y-shaped tubes), of the same diameter, discharging into a central tube whose diameter is greater than or equal to that of the preceding two tubes. They are said to be "symmetrical" since the two tubes for injecting reagents have the same diameter and the same angle relative to the central tube, the device being characterized by an axis of symmetry. Preferably, the central tube has a diameter that is approximately twice as large as the diameter of the opposite tubes; similarly, the speed of fluid in the central tube is preferably equal to half that in the opposite tubes.

It is preferred, however, to use, in particular when the two fluids to be introduced do not have the same flow rate, an asymmetric T or Y mixer (or tube) rather than a symmetrical T or Y mixer (or tube). In asymmetric devices, one of the fluids (the fluid with the lower flow rate in general) is injected into the central tube by means of a side tube of smaller diameter. The latter forms with the central tube an angle of 90° in general (T-shaped tube); this angle may be other than 90° (Y-shaped tube), giving co-current systems (for example angle of 45°) or counter-current systems (for example angle of 135°) relative to the other stream.

Among the rapid mixers that are preferably used are a tangential-jet mixer, a Hartridge-Roughton mixer or a vortex mixer (or precipitator), which derive symmetrical T-shaped devices.

More particularly, in step (vi), a rapid tangential-jet, Hartridge-Roughton or vortex mixer may be used, comprising a chamber containing (a) at least two tangential inlets via which enter separately (but at the same time) either, on the one hand, the silicate, and, on the other hand, the medium resulting from the addition of acidifying agent to the reaction medium obtained from step (v), or, on the one hand, the silicate and the acidifying agent, and, on the other hand, the reaction medium obtained from step (v), and (b) an axial outlet via which leaves the reaction medium obtained in this step (vi), preferably toward a reactor (tank) arranged in series after said mixer. The two tangential inlets are preferably located symmetrically, and opposite, relative to the central axis of said chamber.

The chamber of the tangential-jet, Hartridge-Roughton or vortex mixer optionally used generally has a circular cross section and is preferably of cylindrical shape.

Each tangential inlet tube may have an inside diameter d of 0.5 to 80 mm.

This inside diameter d may be between 0.5 and 10 mm, in particular between 1 and 9 mm, for example between 2 and 7 mm. However, especially at the industrial scale, it is preferably between 10 and 80 mm, in particular between 20 and 60 mm, for example between 30 and 50 mm.

The inside diameter of the tangential-jet, Hartridge-Roughton or vortex mixer chamber optionally used may be between 3d and 6d, in particular between 3d and 5d, for example equal to 4d; the inside diameter of the axial outlet tube may be between 1d and 3d, in particular between 1.5d and 2.5d, for example equal to 2d.

The flow rates of the silicate and of the acidifying agent are determined, for example, such that, at the point of confluence, the two streams of reactants come into contact with each other in a sufficiently turbulent flow zone.

In the process according to the invention, a silica broth is obtained after step (vii), optionally followed by maturation, which broth is then separated out (liquid-solid separation).

The separation performed in the preparation process according to the invention usually comprises filtration, followed by washing, if necessary. The filtration is performed according to any suitable method, for example using a filter press, a band filter or a vacuum filter.

The silica suspension thus recovered (filter cake) is then dried.

This drying may be performed according to any manner known per se.

Preferably, the drying is performed by atomization. To this end, any suitable type of atomizer may be used, especially a turbine atomizer, nozzle atomizer, liquid-pressure atomizer or two-fluid atomizer. In general, when the filtration is performed using a filter press, a nozzle atomizer is used, and when the filtration is performed using a vacuum filter, a turbine atomizer is used.

It should be noted that the filter cake is not always under conditions that enable atomization, especially on account of its high viscosity. In a manner known per se, the cake is then subjected to a crumbling operation. This operation may be performed mechanically, by passing the cake through a mill of colloidal or ball type. The crumbling is generally performed in the presence of water and/or in the presence of an aluminum compound, in particular sodium aluminate, and, optionally, in the presence of an acidifying agent as described previously (in the latter case, the aluminum compound and the acidifying agent are generally added simultaneously). The crumbling operation makes it possible especially to lower the viscosity of the suspension subsequently to be dried.

When the drying is performed using a nozzle atomizer, the silica that may then be obtained is usually in the form of substantially spherical beads.

After the drying, a milling step may then be performed on the recovered product. The silica that may then be obtained is generally in the form of a powder.

When the drying is performed using a turbine atomizer, the silica that may then be obtained may be in the form of a powder.

Finally, the dried product (especially dried with a turbine atomizer) or ground product as indicated previously may optionally be subjected to an aggregation step, which consists, for example, of direct compression, wet granulation (i.e. with use of a binder such as water, silica suspension, etc.), an extrusion or, preferably, dry compacting. When the latter technique is performed, it may prove convenient, before performing the compacting, to deaerate (operation also known as predensification or degassing) the pulverulent products so as to remove the air included therein and to ensure more regular compacting.

The silica that may then be obtained via this aggregation step is generally in the form of granules.

The silica powders, and similarly the silica beads, obtained via the process according to the invention thus offer the advantage, inter alia, of affording access in a simple, efficient and economical manner to granules, especially via standard forming operations, for instance granulation or compacting, without these operations resulting in any degradation liable to mask, or even cancel out, the good intrinsic properties associated with these powders or beads.

The preparation process according to the invention makes it possible especially to obtain precipitated silicas that preferably have a particular morphology, granulometry and porosity.

In the account that follows, the CTAB specific surface area is the outer surface area, which may be determined according to the method described below derived from standard NF ISO 5794-1 (February 2006, $2^{nd}$ print 2006-03).

Principle

The silica is placed in contact with a cetyltrimethylammonium (or hexadecyltrimethylammonium) bromide solution, commonly known as CTAB, with magnetic stirring. The layer of absorbed CTAB is proportional to the specific surface area of the silica.

The silica and the residual CTAB solution are separated. The excess CTAB is titrated with a sodium bis(2-ethylhexy) sulfosuccinate solution, commonly known as OT, up to a point of maximum turbidity.

The outer surface of a silica may be determined by the amount of CTAB that it is capable of absorbing, expressed in $m^2/g$, on product dried for 2 hours at 105° C.

Materials and Equipment

Materials

Filters for 0.45 μm syringes

Flasks 5000 mL graduated cylinder

Magnetic bars 10 mL syringes

Equipment

Balance with an accuracy of within 0.1 mg

Magnetic stirrers

Automatic titrator equipped i) with a photoelectric detector or a photometer measuring the light transmission factor at a wavelength of 550 nm, and ii) a burette, for example a Mettler DL 21 titrator with a 550 nm phototrode.

Procedure

Throughout the analysis, all the apparatus and all the solutions must be at a temperature of between 23 and 27° C., in order to avoid crystallization starting, CTAB crystallizing at 20° C.

Reactants

CTAB solution with a concentration (Co) of 11 g/L, buffered to pH 9.6:

In a 5 liter graduated cylinder containing about 1 liter of deionized water, the following are weighed out/introduced:
5.426 g of boric acid,
6.489 g of potassium chloride and
64.5 $cm^3$ of 1 mol/L sodium hydroxide by burette.

The mixture is then homogenized.

55 g±0.001 g of CTAB and about 3 liters of deionized water are added.

The mixture is homogenized until dissolution of the CTAB is complete, and the resulting solution is adjusted to 5 liters with deionized water.

OT aerosol solution (sodium bis(2-ethylhexyl)sulfosuccinate):

Approximately 1.85±0.01 g of aerosol are weighed out and are dissolved in a one liter graduated cylinder with deionized water (the solution is heated slightly to accelerate the dissolution with magnetic stirring).

The solution obtained is left to stand for 12 days before use.

Analysis Method

Preparation of the Suspension

The following are weighed out approximately exactly in a TP 50/100 flask:
1.60 g±0.05 g of silica for an expected specific surface area of less than 130 $m^2/g$,
0.90 g±0.05 g of silica for an expected specific surface area of between 130 and 180 $m^2/g$,
0.66 g±0.05 g of silica for an expected specific surface area of greater than 180 $m^2/g$.

90 mL (Vo) of CTAB solution are then added to this mass M of silica.

Adsorption

A magnetic bar 35 mm long (for example a "double-ended" magnetic bar) is placed in the flask, which is then stirred by means of magnetic stirrers (residence time of 40 minutes, stirring speed of 600 rpm).

Filtration

Suspension is collected using a syringe. Next, after fitting the syringe with a 0.45 μm filter, the suspension is filtered and about 10 mL of filtered solution are recovered in a flask.

Measurements

The automatic titrator is prepared according to the manufacturer's instructions. The titration parameters are chosen so as to obtain rapid introduction of OT aerosol solution at the start of the titration and slowing-down as a function of the slope of the titration curve in the region of the end point.

Blank Titration

A first titration or blank titration (titration 1) is first performed daily, before the titration of the sample, on the starting CTAB solution, i.e. before mixing with the silica.

Approximately exactly 5 g of starting CTAB solution are weighed out and are then placed in a flask.

54 mL of deionized water are added thereto.

The titration is performed (titration 1).

To do this, the flask is placed in the automatic titrator and the stirring speed is adjusted so as to be able to perform mixing without producing foam.

Next, the titration is started, which ends automatically once the maximum turbidity point is reached.

Each titration is performed in duplicate.

V1 is the volume (in mL) of OT aerosol solution obtained for the titration of the mass M1 (in g) of the starting CTAB solution used for this titration.

Titration of the Sample.

Approximately exactly 5 g of solution recovered after the filtration are weighed out and are then placed in a flask.

54 mL of deionized water are added thereto.

The titration is performed (titration 2).

To do this, the flask is placed in the automatic titrator and the stirring speed is adjusted so as to be able to perform mixing without producing foam.

Next, the titration is started, which ends automatically once the maximum turbidity point is reached.

Each titration is performed in duplicate.

V2 is the volume (in mL) of OT aerosol solution obtained for the titration of the mass M2 (in g) of the CTAB solution recovered after the filtration and used for this titration.

Calculation

The CTAB surface area (in $m^2/g$) is equal to:

$$578.4 \times (Vo/M) \times (100/(100-\text{Hum})) \times (Co/1000) \times [((V1/M1)-(V2/M2))/(V1/M1)]$$

with:
  Vo: volume (in mL) of starting CTAB solution (90 mL) added to the silica to prepare the suspension for the purpose of titration,
  M: mass (in g) of silica to which is added the starting CTAB solution to prepare the suspension for the purpose of titration,
  Hum: humidity (or residual water content) of the silica measured after heat treatment at 105° C. for 2 hours (in number of %),
  Co: initial concentration (in g/L) of the CTAB solution (11 g/L),
  M1: mass (in g) of the starting CTAB solution used for titration 1, i.e. before mixing with the silica,
  V1: volume (in mL) of OT aerosol solution obtained for the titration of M1 (titration 1),
  M2: mass (in g) of the CTAB solution used for titration 2, i.e. after mixing with the silica and adsorption onto the silica,
  V2: volume (in mL) of OT aerosol solution obtained for the titration of M2 (titration 2),
  578.4 corresponds to the surface area (in m$^2$) occupied by 1 gram of CTAB.

The BET specific surface area is determined according to a method following from the Brunauer—Emmet—Teller method described in "The Journal of the American Chemical Society", vol. 60, page 309, February 1938 and corresponding to standard NF ISO 9277 (December 1996).

The pH is measured according to the following method deriving from standard ISO 787/9 (pH of a suspension at 5% in water):

Apparatus:
  calibrated pH-meter (reading accuracy to $\frac{1}{100}^e$)
  combined glass electrode
  200 mL beaker
  100 mL measuring cylinder
  balance with a precision of within 0.01 g.

Procedure:
  5 g of silica are weighed out to within 0.01 g in the 200 mL beaker. 95 mL of water measured from the graduated measuring cylinder are then added to the silica powder. The suspension thus obtained is stirred vigorously (magnetic stirring) for 10 minutes. The pH measurement is then taken.

The XDC granulometric analysis method by centrifugal sedimentation, by means of which the median size d50 of aggregates is measured, is described below:

Materials Required
  BI-XDC centrifugal sedimentation granulometer (Brookhaven-Instrument X Disc Centrifuge) sold by the company Brookhaven Instrument Corporation)
  50 ml high-sided beaker
  50 ml graduated measuring cylinder
  Branson 1500 watt ultrasound probe, without end piece, 13 mm in diameter,
  deionized water
  crystallizing dish filled with ice
  magnetic stirrer Measuring Conditions
  Windows 3.54 version of the software (supplied by the granulometer manufacturer)
  fixed mode
  stirring speed: 5000 rpm
  analysis time: 120 minutes
  density (silica): 2.1
  volume of suspension to be taken: 15 ml Preparation of the Sample
  Add to the high-sided beaker 3.2 g of silica and 40 ml of deionized water.
  Place the beaker containing the suspension in the crystallizing dish filled with ice.
  Immerse the ultrasound probe in the beaker.
  Deaggregate the suspension for 8 minutes using the Branson 1500 watt probe (used at 60% of the maximum power).
  When the deaggregation is complete, place the beaker on a magnetic stirrer.
  Cool the dispersion obtained to room temperature (21° C.)

Preparation of the Granulometer
  Switch on the machine and leave it to warm up for at least 30 minutes.
  Rinse the disk twice with deionized water.
  Place in the disk 15 ml of the sample to be analyzed and start stirring.
  Enter into the software the measuring conditions above.
  Take the measurements.

When the measurements have been taken:
  Stop spinning the disk.
  Rinse the disk several times with deionized water.
  Switch off the apparatus.

Results
  In the apparatus register, record the values of the diameter passing through 50% (mass %) or median size (size for which 50% by mass of the aggregates are smaller than this size) and optionally the Mode value (the derivative of the cumulative granulometric curve gives a frequency curve whose x-axis value at the maximum (x-axis of the main population) is known as the Mode).

The pore volumes and pore diameters/radii given are measured by mercury (Hg) porosimetry, using a Micromeritics Autopore IV 9520 porosimeter, and are calculated via the Washburn relationship with a theta contact angle equal to 140° and a gamma surface tension equal to 485 Dynes/cm; the preparation of each sample is performed as follows: each sample is predried for 2 hours in an oven at 200° C.

$V_{(d5-d100)}$ represents the pore volume constituted by the pores with diameters of between d5 and d50, and $V_{(d5-d100)}$ represents the pore volume constituted by the pores with diameters of between d5 and d100, do being here the pore diameter for which n % of the total surface area of all the pores is provided by pores with a diameter greater than this diameter (the total surface area of the pores (S0) may be determined from the mercury intrusion curve).

The derivative of the cumulative curve (cumulative pore volume (ml/g) as a function of the radius of the pores (nm) gives a frequency curve whose x-axis value at the maximum (x-axis of the main population) for pores with radii of less than 100 nm, is known as the Mode (in nm).

The morphology of the silica, the presence of primary particles of different sizes and the size (the diameter) of said primary particles are illustrated/measured by Transmission Electron Microscopy (TEM) as follows.

1) Principle of the Method:
Transmission electron microscopy (TEM) is used in its imaging mode, at magnifications of up to 400 000, which are suitable for characterizing silica primary particles.

The object of the TEM characterization of silicas is to give access to number-weighted particle size distributions for the silica primary particles.

The images obtained by the TEM technique do not necessarily make it possible to dissociate the various primary particles via image analysis, it falls to the microscopist to identify them; the criterion used to do this is the proportion of the circumference that is recognizable. It may occur that in certain regions of the aggregates, it is impossible to identify primary particles (for example in the case of local overthicknesses of material, or if the particles are too interpenetrated for the notion of a primary particle to have a meaning). However, this is not an obstacle to identifying a sufficiently large number of primary particles to obtain significant values.

The principle of the method is thus to identify a sufficiently large number of primary particles and to analyze their dimensions.

The silica primary particles obtained via the process according to the invention may be likened to spheres; the size analysis is made from the TEM image; it consists, for each identified primary particle, in superposing a circle that correctly reproduces the circumference of the particle, and in measuring its diameter. This operation is repeated on a sufficiently large number of primary particles, in order to establish a number-weighted particle size distribution for these primary particles. This distribution is a differential distribution. A cumulative particle size distribution for the primary particles is deduced therefrom. The descriptor chosen to exploit these dimensions is deduced from the cumulative particle size distribution. It is the number-median diameter d50%.

This is the diameter such that 50% of the counted primary particles have a diameter less than this value, and 50% of the counted primary particles have a diameter greater than this value.

As described below, the silica obtained according to the invention is generally formed from two families of silica primary particles, the diameters of which are different and which are readily discernible on the images obtained via the TEM technique. For a given silica, the operations for identification and counting of the primary particles are thus performed twice, a first time for the small primary particles and a second time for the large primary particles; these two operations are performed separately, and the results obtained are represented by two number-weighted particle size distributions, which are not linked in any way. Given the large differences in diameter between the small primary particles and the large primary particles, it is necessary to perform two separate image acquisitions, at two different magnifications; typical magnification values are 150 000 to 250 000 for the particle size analysis of the large primary particles, and 400 000 for the particle size analysis of the small primary particles. These values may vary as a function of the dimensions of the particles.

2) Procedure:

The materials required are as follows:

a) Transmission electron microscope giving access to magnifications that are at least up to 400 000. The acceleration voltage chosen will preferably be equal to 120 kV.

b) Grilles for TEM observation. One possibility is to prepare 200 mesh copper grilles according to the following procedure:

preparation of a collodion (nitrocellulose) solution containing 0.2% polymer in isoamyl acetate, filling of a crystallizing dish with deionized water, and placing of the TEM grilles inside, deposition of a few drops of the collodion solution onto the surface of the water, evaporation of the solvent so as to produce a collodion film at the surface of the water, drawing so as to deposit the collodion film onto the surface of the grilles, deposition under vacuum of a grain of carbon between 2 and 3 nm in size by means of a carbon metallizer, hydrophilization of the carbonized collodion surface, with an air plasma generated at high voltage and under controlled vacuum, using a hydrophilizer.

After this operation, the surface remains hydrophilic only for about 30 minutes; it is thus preferable not to perform this operation until the last moment, once the silica suspension is ready.

Beforehand, the transmission electron microscope must be correctly aligned according to the procedure given by its constructor. In addition, it must undergo a correct functioning check relating to its magnification. To this end, a certified calibration or reference material is used, such that the magnifications 150 000 and 400 000 are included within the range of magnification values adopted for the check. The observed difference between the distance values measured and the distance values given on the calibration or reference material certificate must be at most equal to 10%.

The procedure is broken down as follows:

i) Preparation of a silica suspension deaggregated by ultrasound according to the protocol given for the preparation of the sample in the XDC particle size analysis method by centrifugal sedimentation described hereinabove.

ii) 50-fold dilution of this suspension in deionized water.

iii) Deposition of a few microliters of this suspension on a hydrophilized TEM grille (less than 5 µL).

iv) Once the grille has dried, placing it on the object holder.

v) Introduction of the object holder into the microscope and execution of the standard adjustments (in particular objective lens astigmatism and eucentricity).

vi) Since silica is very sensitive to electron radiation, the image acquisition must be performed on fields that have never been exposed to electrons, and under conditions such that the exposure of the field observed to electrons is as short as possible, pose time included (<5 seconds). If necessary, a "low-dose" exposure mode or equivalent is used. Great importance must be attached to the observation of detail of the field observed, in order to be certain that the irradiation damage is negligible. If, despite all these precautions, irreversible damage appears on the sample, it will be necessary to envision cold observation using an object holder cooled to the temperature of liquid nitrogen.

vii) At least ten images are taken at a magnification of 150 000 and ten images at a magnification of 400 000, the object being to be certain of counting at least 200 small primary particles and 200 large primary particles. The area of the grille effectively used for the identification and counting of the particles must be a minimum of 0.5 µm$^2$ for the small primary particles and 3.0 µm$^2$ for the large primary particles.

viii) It is considered hereinbelow that the small primary particles are the particles inscribed in a circle with a diameter strictly less than 10 nm, and that the large primary particles are the particles inscribed in a circle with a diameter of greater than or equal to 10 nm.

ix) As stated above, the determination of the particle size distribution of the small primary particles and the determination of the particle size distribution of the large primary particles are performed separately, these two distributions being number-weighted. The objects identified as being primary particles are likened to spheres, and the circle that is considered for characterizing each particle is the circle in which the particle in question is inscribed. This operation may be performed using software, for instance ImageJ, Adobe Photoshop or Analysis.

20 granulometric classes are defined between 0 and 10 nm for the small primary particles, in a linear manner (i.e. classes 0.5 nm wide); 20 granulometric classes are defined above 10 nm for the large primary particles, in a linear manner, so as to represent all the large primary particles identified.

The identification of the primary particles is based on the portion of their periphery that is recognizable. In the case of the large primary particles, it is considered that at least about a third of the circumference must be recognizable in order to validate the identification. This is the case for the particles located at the periphery of the aggregate, or for the particles with a sufficient contrast difference with the rest of the aggregate.

In the case of the small primary particles, it is considered that at least about half of the circumference must be recognizable in order to validate the identification. This is observed at the periphery of the aggregates, on the small particles visible at the surface of the large primary particles, or in regions of the aggregate of low thickness, for small particles with a sufficient contrast difference with the rest of the aggregate.

x) For each type of primary particle, large or small, the number-differential particle size distribution is determined, and from this differential distribution, the cumulative particle size distribution is determined. The latter operation may be performed using software such as, for example, Microsoft Excel. From each cumulative particle size distribution, the number-median diameter D50%, expressed in nanometers, is determined.

xi) Once these two particle size distributions have been determined, it is necessary to check that this TEM characterization procedure is suitable for the silica studied, by considering for each of the two families of particles the envelope of the differential particle size distribution. This envelope must have a maximum in the region 0 to 10 nm for the family of small primary particles, and it must have a maximum above 10 nm for the family of large primary particles. This validates the existence of two families of particles that are distinct in terms of their sizes.

The morphology of the silica and the presence of primary particles of different sizes may also be illustrated by small-angle X-ray scattering (SAXS) as follows.

1) Principle of the Method:

Small-angle X-ray scattering (SAXS) consists in exploiting the deviation of an incident X-ray beam, of wavelength λ, passing through the sample, in a cone of a few degrees of angle. A scattering angle θ has a corresponding wave vector defined by the following relationship:

$$q = \frac{4\pi}{\lambda}\sin\frac{\theta}{2}$$

the unit of which is $Å^{-1}$.

Each scattering angle has a corresponding wave vector q defined in reciprocal space. This wave vector corresponds to a spatial scale defined in real space, and which is equivalent to $2\pi/q$. Small-angle scattering thus characterizes the large distances in the sample, and conversely large-angle scattering characterizes the small distances in the sample. The technique is sensitive to the way in which the material is distributed in space.

Basic references regarding this technique are given below:

[1] Small Angle Scattering of X rays, Guinier, A., Fournet G., (1955), Wiley, New York.

[2] Small Angle X Ray Scattering, Glatter O., Krattky O., (1982), Academic Press, New York.

[3] Analysis of the Small-Angle Intensity Scattered by a Porous and Granular Medium, Spalla O., Lyonnard S., Testard F., J. Appl. Cryst. (2003), 36, 338-347.

The configuration required for characterizing silicas by SAXS according to the criterion defined below is as follows:

SAXS assembly working in a transmission geometry (i.e. the incident beam passing through the sample), with an incident wavelength of between 0.5 and 2 Angströms (Å), wave vector interval q of between 0.015 $Å^{-1}$ and 0.30 $Å^{-1}$, which makes it possible to characterize distances in real space ranging from 420 to 20 Å, assembly checked on q scale using a suitable standard (for example silver behenate, octadecanol or any other compound that gives a fine SAXS line within the above q interval), one-dimensional or, preferably, two-dimensional linear detector, the assembly must make it possible to measure the transmission of the preparation, i.e. the ratio between the intensity transmitted by the sample and the incident intensity.

Such an assembly may be, for example, a laboratory assembly, operating on a source of X-ray tube type or rotating anode type, preferably using the $k_\alpha$ emission of copper at 1.54 Å. The detector may be an image plate or, preferably, a gas detector. It may also be an SAXS assembly on a synchrotron.

2) Procedure:

The silica sample is analyzed in pulverulent solid form. The powder is placed between two X-ray-transparent windows. Independently of this preparation, an empty cell is prepared with only two transparent windows, containing no silica inside. The scattering by the empty cell must be recorded separately from the scattering by the silica. During this operation, known as a "background measurement", the scattered intensity comes from all the contributions external to the silica, such as the electronic background noise, the scattering by the transparent windows, and the residual divergence of the incident beam.

These transparent windows must give a low background noise relative to the intensity scattered by the silica over the explored wave vector interval. They may be made of mica, a Kapton film or, preferentially, an adhesive Kapton film.

Prior to the actual SAXS acquisition on the silica, the quality of the preparation should be checked by means of measuring the transmission of the cell filled with silica.

The steps to be taken are thus the following:

2.1) Production of a cell consisting of two windows without silica (empty cell).

2.2) Production of a cell consisting of two windows, with a sample of silica powder inside.

The amount of silica introduced must be less than 50 mg. The silica must form a layer less than 100 μm thick. It is preferably sought to obtain a monolayer of silica grains arranged on a window, which is easier to obtain with adhesive windows. The quality of the preparation is controlled by measuring the transmission (step 2.3)).

2.3) Measurement of the transmission of the empty cell and of the silica cell.

The ratio R is defined in the following manner:

R=transmission of the silica cell/transmission of the empty cell

R must be between 0.6 and 0.9, in order to minimize the risks of multiple scattering, while at the same time conserving a satisfactory signal-to-noise ratio at large q. If the value of R is too small, the amount of silica visible by the beam should be reduced; if it is too large, silica should be added.

2.4) SAXS acquisition on the empty cell and on the silica cell.

The acquisition times must be determined such that the signal/noise ratio at large q is acceptable. They must be such that in the immediate vicinity of $q=0.12$ Å$^{-1}$, the fluctuations of the function F(q) defined below do not have to exceed ±5% relative to the value that the function F takes at this point.

2.5) If a two-dimensional detector was used: radial regrouping of each of the two two-dimensional spectra to obtain the scattered intensity as a function of the wave vector q.

The determination of the scattered intensity must take into account the exposure time, the intensity of the incident beam, the transmission of the sample, the solid angle intercepted by the pixel of the detector. The determination of the wave vector must take into account the wavelength of the incident beam and the sample-detector distance.

2.6) If a one-dimensional detector was used: the preceding determinations concerning the scattered intensity and the wave vector must be performed, but no radial regrouping is to be envisaged.

2.7) Two spectra are thus obtained reducing the information to the variation of the scattered intensity as a function of the wave vector q: one spectrum for the empty cell and one spectrum for the silica cell.

2.8) Subtraction of the scattered intensity by the empty cell from the scattered intensity by the silica cell ("background" subtraction).

2.9) The SAXS spectrum of the silica, after "background" subtraction, shows a monotonous decrease which occurs according to a regime similar to the Porod regime, i.e. the intensity decreases very rapidly with the wave vector according to a law similar to a $q^{-4}$ power law. Small deviations relative to this Porod law are more visible by representing the data according to the Krattky-Porod method. This is a matter of representing F(q) as a function of q, with:

$$F(q)=I\times q4$$

in which I represents the scattered intensity after "background" subtraction and q represents the wave vector.

2.10) In the Krattky-Porod representation, when the spectrum is described in the sense of increasing wave vectors, the presence of two populations of sizes of particles is reflected by a first increase in the function F(q), which characterizes the larger particles, and then a second increase in the function F(q), which characterizes the smaller particles. An oscillation of the intensity at the first increase may possibly be observed, which may be observed if the size distribution of the larger particles is relatively narrow.

2.11) The SAXS criterion defined in the context of the present specification is based on the increase of the function F between two defined wave vector limits, which are $q1=0.03$ Å$^{-1}$ and $q2=0.12$ Å$^{-1}$.

A ratio (parameter) C is defined in the following manner:

$$C=[F(q2)-F(q1)]/F(q2)$$

The dispersibility (and capacity for deaggregation) of the silicas obtained via the process according to the invention may be quantified by means of specific deaggregation tests.

One of the deaggregation tests is described below:
1) Principle:

The cohesion of the aggregates is assessed via a granulometric measurement (by laser scattering), performed on a silica suspension deaggregated beforehand by ultrasonification; the capacity for deaggregation of the silica is thus measured (rupture of objects from 0.1 to a few tens of microns).

2) Materials:
Malvern Mastersizer 2000, equipped with a hydroG standard module.
Precision balance giving 0.1 mg (for example Mettler AE260).
Deionized water.
Bioblock sonificator (Vibracell 75043) with 750 watts (equipped with an end piece 13 mm in diameter), used at 80% of its nominal power.
50 mL beaker (high-sided).
50 mL graduated measuring cylinder.
Crystallizing dish+ice.

3) Measuring Conditions:
The full analysis conditions are controlled manually by adjusting:
the parameters of the sampler
pump delivery rate: 1600 rpm
stirrer speed: 600 rpm
measuring parameters:
sample measurement time: 10 seconds
background noise measurement time: 10 seconds
number of measurements: 3
optical properties:
optical model: Fraunhofer theory
standard analysis, normal sensitivity 4) Operations to be Performed:
i) Preparation of the Sample
in the beaker placed on the balance plate, weigh out about 2 g of the sample to be analyzed,
add 50 mL of deionized water using the graduated measuring cylinder,
place the beaker containing the silica suspension in the crystallizing dish containing ice,
dip the ultrasound probe in this suspension, leaving only 1 cm between the end of the probe and the bottom of the beaker,
deaggregate for 5 minutes 30 seconds.

ii) Preparation of the Granulometer
In the software, proceed in the following manner:
activate a file in which the measurements will be recorded (for example reader A)
open "measure"—"manual"
open "option"—particle name: Fraunhofer—dispersant: water (see paragraph 3 optical properties)
open "preparer"—start a cleaning cycle
when the cleaning is complete, adjust the stirrer parameters and the pump delivery parameters as indicated in paragraph 3
click on start.

When the background noise and alignment measurements are complete, introduce an aliquot of the deaggregated silica suspension into the cuvette so as to obtain correct obscuring, and continue the analysis cycle.

When the analysis is complete, start a cleaning cycle.
When the cleaning is complete, zero the pump delivery and the stirring speed.

The median diameter value $D_{50M}$ (or Malvern median diameter) that is obtained is proportionately lower the higher the capacity for deaggregation of the silica.

The number of silanols per nm$^2$ of surface area is determined by grafting methanol onto the surface of the silica. In a first stage, 1 gram of crude silica is suspended in 10 mL of methanol, in a 110 mL autoclave (Top Industrie, reference 09990009). A magnetic bar is introduced and the autoclave, hermetically and calorifically sealed, is heated to 200° C. (40 bar) on a heated magnetic stirrer for 4 hours. The autoclave is then cooled in a bath of cold water. The grafted silica is recovered by decantation and the residual methanol is evaporated off under a stream of nitrogen. Next, the grafted silica is dried at 130° C. under vacuum for 12 hours. The carbon content is determined by elemental analysis (NCS 2500 analyzer from CE Instruments) on the crude silica and on the grafted silica. This carbon assay on the grafted silica is performed within three days of the end of drying, since atmospheric moisture or heat may in fact bring about hydrolysis of the methanol grafting. The number of silanols per $nm^2$ is calculated by the following formula:

$$N_{SiOH/nm2}=[(\% \ C_g-\% \ C_C)\times 6.023\times 10^{23}]/[S_{BET}\times 10^{18}\times 12\times 100]$$

with % $C_g$: mass percentage of carbon present on the grafted silica

% $C_b$: mass percentage of carbon present on the crude silica $S_{BET}$: BET specific surface area of the silica ($m^2$/g)

Implementation of the preparation process according to the invention makes it possible to obtain a precipitated silica of particular morphology: specifically, it is preferably formed from aggregates of primary particles (A) of silica at the surface of which are (are grafted) primary particles (B) of silica smaller in size than the primary particles (A).

It preferably has:
a CTAB specific surface area ($S_{CTAB}$) of between 60 and 400 $m^2$/g,
a median size d50 of aggregates (primary particles (A) or large primary particles+primary particles (B) or small primary particles), measured by XDC granulometry after ultrasound deaggregation, such that:

$$d50 \ (nm) > (6214/S_{CTAB} \ (m^2/g))+23,$$

a pore volume distribution such that:

$$V_{(d5\text{-}d50)}/V_{(d5\text{-}d100)} > 0.906-(0.0013\times S_{CTAB} \ (m^2/g)),$$
and a pore size distribution (diameters) such that:

$$\text{Mode (nm)} > (4166/S_{CTAB} \ (m^2/g))-9.2.$$

This precipitated silica may have a parameter C, measured by small-angle X-ray scattering (SAXS), such that: $C/S_{CTAB}$ ($m^2$/g)>0.001.

This illustrates particular morphology, for example the presence of two populations of primary particles of different sizes.

It is advantageously formed from aggregates of large silica primary particles on which are (are grafted) small silica primary particles (spp), the number-median diameter of the large primary particles (lpp) being greater than 8 nm, for example between 8.5 and 12 nm, especially between 9 and 12 nm, or being at least 12 nm, in particular at least 13 nm, for example at least 14 nm, or even at least 17 nm, and the number-median diameter of the small primary particles (spp) being between 2 and 8 nm, in particular between 3 and 6 nm, for example between 3 and 5 nm (diameters determined by TEM).

In general, the precipitated silica obtained via the process according to the invention contains (determination by TEM, for example) 30% to 95%, preferably 55% to 90% and in particular 60% to 85% by number of primary particles (B) (or small primary particles), and 5% to 70%, preferably 10% to 45% and in particular 15% to 40% by number of primary particles (A) (or large primary particles).

Preferably, in the precipitated silica obtained via the process according to the invention, there are very few, or even no, isolated ("outside-grain") small primary particles, aggregated together or not, i.e. not connected to aggregates of large primary particles. The proportion of such isolated small primary particles is generally less than 10% by number, in particular less than 5% by number, and for example substantially zero.

In general, the small primary particles are solidly attached to aggregates of large primary particles.

Preferably, the pore volume distribution of the precipitated silica obtained via the process according to the invention is also such that:

$$V_{(d5\text{-}d50)}/V_{(d5\text{-}d100)} > 0.71, \text{ in particular } V_{(d5\text{-}d50)}/V_{(d5\text{-}d100)} > 0.72.$$

The precipitated silica prepared via the process according to the invention usually has a CTAB specific surface area ($S_{CTAB}$) of between 60 and 400 $m^2$/g, preferably between 80 and 300 $m^2$/g and in particular between 100 and 250 $m^2$/g. It may be between 120 and 230 $m^2$/g, especially between 130 and 210 $m^2$/g, for example between 140 and 200 $m^2$/g.

It generally has a BET specific surface area ($S_{BET}$) of between 60 and 500 $m^2$/g, preferably between 90 and 380 $m^2$/g and in particular between 120 and 300 $m^2$/g. It may be between 140 and 270 $m^2$/g, especially between 160 and 260 $m^2$/g, for example between 175 and 250 $m^2$/g.

Preferably, the precipitated silica obtained via the process according to the invention has a certain, but not excessive, microporosity; thus, in general, its CTAB specific surface area ($S_{CTAB}$) and its BET specific surface area ($S_{BET}$) are such that the ratio $S_{BET}/S_{CTAB}$ is between 1.0 and 1.5, preferably between 1.1 and 1.4 and in particular between 1.15 and 1.35.

The precipitated silicas prepared via the process according to the invention preferably have satisfactory dispersibility in polymers.

If their median diameter ($D_{50M}$), after deaggregation by ultrasound, is generally not more than 9.0 μm, it is usually less than 6.5 μm, preferably less than 6.0 μm and especially less than 5.0 μm; it may in particular be less than 4.0 μm, for example less than 3.0 μm.

Their number of silanols per $nm^2$, $N_{SiOH/mm2}$, is generally between 3.5 and 6 and especially between 3.9 and 5.5.

Their pH is usually between 6.2 and 7.6 and especially between 6.4 and 7.4.

The precipitated silicas prepared via the process according to the invention are generally in at least one of the following forms: substantially spherical beads, powders, granules.

They may thus be in the form of substantially spherical beads, in particular with a mean size of at least 80 μm.

This mean size of the beads may be at least 100 μm, for example at least 150 μm; it is generally not more than 300 μm and is preferably between 100 and 270 μm and especially between 200 and 260 μm. This mean size is determined according to standard NF X 11507 (December 1970) by dry sieving and determination of the diameter corresponding to a cumulative oversize of They may also be in powder form, generally with a mean size of at least 3 μm, in particular of at least 10 μm, for example of at least 15 μm; this may be between 15 and 60 μm (especially between 20 and 45 μm) or between 30 and 150 μm (especially between 45 and 120 μm).

They may also be in the form of granules (generally of substantially parallelepipedal shape), in particular with a size of at least 1 mm, for example between 1 and 10 mm, especially along the axis of their largest dimension (length).

The precipitated silica prepared via the process according to the invention may be used in many applications.

It may be used in the reinforcement of natural or synthetic polymers.

Generally, it shows good dispersibility in polymers and gives them a very satisfactory compromise of properties, for example as regards their mechanical, dynamic and rheological properties.

The polymer compositions in which it may be used, especially as reinforcing filler, are generally based on one or more polymers or copolymers, in particular one or more elastomers, especially thermoplastic elastomers, preferably having at least one glass transition temperature of between −150 and +300° C., for example between −150 and +20° C.

Possible polymers that may be mentioned include diene polymers, in particular diene elastomers.

For example, it is possible to use polymers or copolymers derived from aliphatic or aromatic monomers, comprising at least one unsaturation (especially such as ethylene, propylene, butadiene, isoprene or styrene), polybutyl acrylate, or mixtures thereof; mention may also be made of silicone elastomers, functionalized elastomers (for example functionalized with functions capable of reacting with the surface of the silica) and halogenated polymers. Mention may be made of polyamides.

The polymer (copolymer) may be a bulk polymer (copolymer), a polymer (copolymer) latex or a solution of polymer (copolymer) in water or in any other suitable dispersing liquid.

Examples of diene elastomers that may be mentioned include polybutadienes (BR), polyisoprenes (IR), butadiene copolymers, isoprene copolymers, or mixtures thereof, and in particular styrene-butadiene copolymers (SBR, especially ESBR (emulsion) or SSBR (solution)), isoprene-butadiene copolymers (BIR), isoprene-styrene copolymers (SIR), isoprene-butadiene-styrene copolymers (SBIR) and ethylene-propylene-diene terpolymers (EPDM). Mention may also be made of natural rubber (NR).

The polymer compositions may be vulcanized with sulfur (they are then referred to as vulcanisates) or crosslinked especially with peroxides.

In general, the polymer compositions also comprise at least one coupling agent (silica/polymer) and/or at least one silica coating agent; they may also comprise, inter alia, an antioxidant.

Nonlimiting examples of coupling agents that may especially be used include "symmetrical" or "asymmetric" polysulfide silanes; mention may be made more particularly of bis(($C_1$-$C_4$)alkoxyl($C_1$-$C_4$)alkylsilyl($C_1$-$C_4$)alkyl) polysulfides (especially disulfides, trisulfides or tetrasulfides), for instance monoethoxydimethylsilylpropyl tetrasulfide.

The coupling agent may be pregrafted onto the polymer.

It may also be used in free form (i.e. not pregrafted) or grafted onto the surface of the silica. This is likewise the case for the optional coating agent.

The coupling agent may optionally be combined with a suitable "coupling activator", i.e. a compound which, when mixed with this coupling agent, increases its efficacy.

The weight proportion of precipitated silica in the polymer composition may vary within a relatively wide range. It is usually from 20% to 80%, for example 30% to 70% of the amount of the polymer(s).

The precipitated silica obtained via the process according to the invention may advantageously constitute all of the reinforcing inorganic filler, and even all of the reinforcing filler, of the polymer composition.

However, this precipitated silica obtained via the process according to the invention may optionally be combined with at least one other reinforcing filler, in particular such as a commercial highly dispersible silica, for instance Z1165MP, Z1115MP, a treated precipitated silica (for example "doped" with a cation such as aluminum), another reinforcing inorganic filler, for instance alumina, or even a reinforcing organic filler, especially carbon black (optionally coated with an inorganic layer, for example of silica). The precipitated silica obtained via the process according to the invention then preferably constitutes at least 50%, or even at least 80%, by weight of the total amount of reinforcing filler.

Nonlimiting examples of finished articles based on the polymer compositions described previously (especially based on the vulcanisates mentioned above) that may be mentioned include shoe soles (preferably in the presence of a coupling agent (silica/polymer), for example monoethoxydimethylsilylpropyl tetrasulfide), tires, floorcoverings, gas barriers, flame-retardant materials and also technical components such as cable car rollers, domestic electrical appliance seals, liquid or gas pipe seals, brake system seals, sheaths, and transmission cables and belts.

The precipitated silica prepared via the process according to the invention may also be used especially as a catalyst support, as an active material absorbent (in particular a support for liquids, for example used in food, such as vitamins (vitamin E), choline chloride), as a viscosity-enhancing agent, texturizer or anticaking agent, as a battery separator component, or as an additive for toothpaste, concrete or paper.

The examples that follow illustrate the invention without, however, limiting its scope.

Example 1

10.8 liters of water are placed in a 25 liter stainless-steel reactor fitted with an impeller stirring system and a heating jacket. This medium is stirred and brought to 94° C. The entire reaction is performed at this temperature with stirring (360 rpm, impeller stirring). Sulfuric acid, with a concentration equal to 80 g/L, is introduced into the reactor until the pH of this feedstock reaches a value of 3.7 (i.e. 24 grams of sulfuric acid over about 1 minute).

A sodium silicate solution (with an $SiO_2/Na_2O$ weight ratio equal to 3.49) with a concentration of 235 g/L is then introduced into said formed feedstock, over 35 minutes at a rate of 55 g/min, simultaneously with sulfuric acid with a concentration equal to 80 g/L, at a rate regulated so as to maintain the pH of the reaction medium at a value of 3.9.

At the end of the 35 minutes of simultaneous addition, the introduction of acid is stopped and the introduction of sodium silicate solution (with an $SiO_2/Na_2O$ weight ratio equal to 3.49) having a concentration of 235 g/L is continued, at a rate of 55 g/min, until the pH of the reaction medium reaches a value of 8 (i.e. 169 grams of silicate solution over about 3 minutes).

A sodium silicate solution (with an $SiO_2/Na_2O$ weight ratio equal to 3.49) having a concentration of 235 g/L is then introduced into the reaction medium, over 40 minutes, at a rate of 55 g/min, simultaneously with sulfuric acid with a concentration equal to 80 g/L, at a rate regulated so as to maintain the pH of the reaction medium at a value of 8.

At the end of the 40 minutes of this second simultaneous addition, the introduction of silicate is stopped and the introduction of the sulfuric acid with a concentration equal to 80 g/L is continued, at a rate of 39 g/min, until the pH of the reaction medium reaches a value of 4 (i.e. 207 grams of sulfuric acid over about 5 minutes).

A sodium silicate solution (with an $SiO_2/Na_2O$ weight ratio equal to 3.49) having a concentration of 235 g/L is then introduced into the reaction medium, over 22 minutes, at a rate of 20 g/min, simultaneously with sulfuric acid with a concentration equal to 80 g/L, at a rate regulated so as to maintain the pH of the reaction medium at a value of 4.

At the end of the 22 minutes of this third simultaneous addition, a sodium silicate solution, of the type described above, is introduced, at a rate of 20 g/min, so as to raise the pH of the reaction medium to 5.2 (i.e. 41 grams of silicate solution over 2 minutes).

After the reaction, a reaction broth of precipitated silica is obtained, which is kept stirring at a temperature of 94° C. for 5 minutes. After this maturation, the precipitated silica broth is recovered by emptying the reactor.

The broth is filtered and washed under vacuum (solids content of 14% by weight). The filter cake obtained is washed four times with 5 liters of water. It is then resuspended by mechanical crumbling in the presence of water. The resulting broth (solids content of 10% by weight) is dried by means of a turbine atomizer.

The characteristics of the precipitated silica obtained (in powder form) are then as follows:
CTAB specific surface area: 194 $m^2/g$
Median size d50 of aggregates: 75 nm
$V_{(d5-d50)}/V_{(d5-d100)}$: 0.76
Mode (Hg porosimetry): 14.0 nm
$D_{50M}$ (after ultrasound deaggregation): 4.9 μm It is found that the precipitated silica obtained is formed from aggregates of large primary particles (lpp) of silica at the surface of which are small primary particles (spp) of silica.

Example 2

9.4 liters of water are placed in a 25 liter stainless-steel reactor fitted with an impeller stirring system and a heating jacket. This medium is stirred and brought to 92° C. The entire reaction is performed at this temperature with stirring (360 rpm, impeller stirring). Sulfuric acid, with a concentration equal to 80 g/L, is introduced into the reactor until the pH of this feedstock reaches a value of 4.2 (i.e. 28 grams of sulfuric acid over about 3 minutes).

A sodium silicate solution (with an $SiO_2/Na_2O$ weight ratio equal to 3.47) having a concentration of 235 g/L is then introduced into said formed feedstock, over 10 minutes, at a rate of 46.8 g/min, simultaneously with sulfuric acid with a concentration equal to 80 g/L, at a rate regulated so as to maintain the pH of the reaction medium at a value of 4.4.

At the end of the 10 minutes of simultaneous addition, the introduction of acid is stopped and the introduction of sodium silicate solution (with an $SiO_2/Na_2O$ weight ratio equal to 3.47) having a concentration of 235 g/L is continued, at a rate of 46.8 g/min, until the pH of the reaction medium reaches a value of 8 (i.e. 55 grams of silicate solution over about 1 minute).

A sodium silicate solution (with an $SiO_2/Na_2O$ weight ratio equal to 3.47) having a concentration of 235 g/L is then introduced into the reaction medium, over 100 minutes, at a rate of 46.8 g/min, simultaneously with sulfuric acid with a concentration equal to 80 g/L, at a rate regulated so as to maintain the pH of the reaction medium at a value of 8.

At the end of the 100 minutes of this second simultaneous addition, the introduction of silicate is stopped and the introduction of the sulfuric acid with a concentration equal to 80 g/L is continued, at a rate of 39 g/min, until the pH of the reaction medium reaches a value of 4 (i.e. 194 grams of sulfuric acid over about 5 minutes).

A sodium silicate solution (with an $SiO_2/Na_2O$ weight ratio equal to 3.47) having a concentration of 235 g/L is then introduced into the reaction medium, over 85 minutes, at a rate of 20 g/min, simultaneously with sulfuric acid with a concentration equal to 80 g/L, at a rate regulated so as to maintain the pH of the reaction medium at a value of 4.

At the end of the 85 minutes of this third simultaneous addition, a sodium silicate solution, of the type described above, is introduced, at a rate of 20 g/min, so as to raise the pH of the reaction medium to 5.2 (i.e. 97 grams of silicate solution over 5 minutes).

After the reaction, a reaction broth of precipitated silica is obtained, which is kept stirring at a temperature of 92° C. for 5 minutes. After this maturation, the precipitated silica broth is recovered by emptying the reactor.

The broth is filtered and washed under vacuum (solids content of 14% by weight). The filter cake obtained is washed four times with 5 liters of water. It is then resuspended by mechanical crumbling in the presence of water. The resulting broth (solids content of 10% by weight) is dried by means of a turbine atomizer.

The characteristics of the precipitated silica obtained (in powder form) are then as follows:
CTAB specific surface area: 135 $m^2/g$
Median size d50 of aggregates: 142 nm
$V_{(d5-d50)}/V_{(d5-d100)}$: 0.80
Mode (Hg porosimetry): 22.0 nm
$D_{50M}$ (after ultrasound deaggregation): 6.3 μm It is found that the precipitated silica obtained is formed from aggregates of large primary particles (lpp) of silica at the surface of which are small primary particles (spp) of silica.

Example 3

11.8 liters of water are placed in a 25 liter stainless-steel reactor fitted with an impeller stirring system and a heating jacket. This medium is stirred and brought to 86° C. The entire reaction is performed with stirring (360 rpm, impeller stirring). Sulfuric acid, with a concentration equal to 80 g/L, is introduced into the reactor until the pH of this feedstock reaches a value of 3.8 (i.e. 34 grams of sulfuric acid over about 2 minutes).

A sodium silicate solution (with an $SiO_2/Na_2O$ weight ratio equal to 3.47) having a concentration of 235 g/L is then introduced into said formed feedstock, over 35 minutes, at a rate of 59 g/min, simultaneously with sulfuric acid with a concentration equal to 80 g/L, at a rate regulated so as to maintain the pH of the reaction medium at a value of 4.0.

At the end of the 35 minutes of simultaneous addition, the introduction of acid is stopped and the introduction of sodium silicate solution (with an $SiO_2/Na_2O$ weight ratio equal to 3.47) having a concentration of 235 g/L is continued, at a rate of 59 g/min, until the pH of the reaction medium reaches a value of 8 (i.e. 221 grams of silicate solution over about 4 minutes). In parallel to this introduction of sodium silicate solution, the reaction medium is brought to 92° C. The rest of the reaction is performed at this temperature.

A sodium silicate solution (with an $SiO_2/Na_2O$ weight ratio equal to 3.47) having a concentration of 235 g/L is then introduced into the reaction medium, over 40 minutes, at a rate of 59 g/min, simultaneously with sulfuric acid with a concentration equal to 80 g/L, at a rate regulated so as to maintain the pH of the reaction medium at a value of 8.

At the end of the 40 minutes of this second simultaneous addition, the introduction of silicate is stopped and the introduction of the sulfuric acid with a concentration equal to 80 g/L is continued, at a rate of 39 g/min, until the pH of the reaction medium reaches a value of 4 (i.e. 316 grams of sulfuric acid over about 8 minutes).

A sodium silicate solution (with an $SiO_2/Na_2O$ weight ratio equal to 3.47) having a concentration of 235 g/L is then introduced into the reaction medium, over 81 minutes, at a rate of 18.2 g/min, simultaneously with sulfuric acid with a concentration equal to 80 g/L, at a rate regulated so as to maintain the pH of the reaction medium at a value of 4.

At the end of the 81 minutes of this third simultaneous addition, a sodium silicate solution, of the type described above, is introduced, at a rate of 15 g/min, so as to raise the pH of the reaction medium to 5.2 (i.e. 91 grams of silicate solution over 6 minutes).

After the reaction, a reaction broth of precipitated silica is obtained, which is kept stirring at a temperature of 92° C. for 5 minutes. After this maturation, the precipitated silica broth is recovered by emptying the reactor.

The broth is filtered and washed under vacuum (solids content of 14% by weight). The filter cake obtained is washed four times with 5 liters of water. It is then resuspended by mechanical crumbling in the presence of water. The resulting broth (solids content of 10% by weight) is dried by means of a turbine atomizer.

The characteristics of the precipitated silica obtained (in powder form) are then as follows:

CTAB specific surface area: 225 m$^2$/g
Median size d50 of aggregates: 67 nm
$V_{(d5-d50)}/V_{(d5-d100)}$: 0.76
Mode (Hg porosimetry): 11.6 nm
C (SAXS): 0.450
$D_{50M}$ (after ultrasound deaggregation): 3.9 μm It is found that the precipitated silica obtained is formed from aggregates of large primary particles (lpp) of silica at the surface of which are small primary particles (spp) of silica.

The invention claimed is:

1. A process for preparing precipitated silica, the process comprising reacting a silicate with an acidifying agent, obtaining a silica suspension, separating and drying the suspension, wherein reacting the silicate with the acidifying agent comprises:
   (i) forming an aqueous feedstock with a pH of between 2 and 5,
   (ii) adding silicate and an acidifying agent simultaneously to said feedstock to form a reaction medium, such that the pH of the reaction medium is maintained between 2 and 5,
   (iii) stopping the addition of the acidifying agent while continuing the addition of silicate to the reaction medium until a pH value of between 7 and 10 is obtained,
   (iv) adding silicate and acidifying agent simultaneously to the reaction medium, while maintaining the pH of the reaction medium between 7 and 10,
   (v) stopping the addition of the silicate while continuing the addition of the acidifying agent to the reaction medium until a pH value of between 2.5 and 5.3 is obtained,
   (vi) placing the reaction medium in contact with the acidifying agent and the silicate, while maintaining the pH of the reaction medium between 2.5 and 5.3,
   (vii) adding an alkaline agent to the reaction medium obtained, so as to increase the pH of the reaction medium to a value of between 4.7 and 6.3, this step (vii) being optional in the case where, in step (vi), a reaction medium with a pH of between 5.0 and 5.3 is placed in contact with the acidifying agent and the silicate, such that the pH of the reaction medium is maintained between 5.0 and 5.3.

2. A process for preparing precipitated silica comprising reacting a silicate with an acidifying agent, obtaining a silica suspension, separating and drying the suspension, wherein reacting the silicate with the acidifying agent comprises:
   (i) forming an aqueous feedstock with a pH of between 2 and 5,
   (ii) adding silicate and acidifying agent simultaneously to said feedstock feedstock to form a reaction medium, such that the pH of the reaction medium is maintained between 2 and 5,
   (iii) stopping the addition of the acidifying agent while continuing the addition of silicate to the reaction medium until a pH value of between 7 and 10 is obtained,
   (iv) adding silicate and acidifying agent simultaneously to the reaction medium, while maintaining the pH of the reaction medium between 7 and 10,
   (v) stopping the addition of the silicate while continuing the addition of the acidifying agent to the reaction medium until a pH value of between 2.5 and 5.3 is obtained,
   (vi) placing the reaction medium in contact with the acidifying agent and the silicate, while maintaining the pH of the reaction medium between 2.5 and 5.3, and
   (vii) adding an alkaline agent to the reaction medium obtained, so as to increase the pH of the reaction medium to a value of between 4.7 and 6.3.

3. The process as claimed in claim 1, wherein step (i) comprises adjusting the pH of the feedstock to a pH value of between 2 and 5 by adding the acidifying agent to water.

4. The process as claimed in claim 1, wherein all the steps are performed between 75° C. and 97° C.

5. The process as claimed in claim 1, wherein, in step (vi), the acidifying agent is first added to said reaction medium, followed by the silicate.

6. The process as claimed in claim 1, wherein, in step (vi), the acidifying agent and the silicate are added simultaneously to said reaction medium.

7. The process as claimed in claim 1, wherein a maturation step is performed after step (vii).

8. The process as claimed in claim 1, wherein step (vi) is performed in a rapid mixer or in a turbulent flow zone.

9. The process as claimed in claim 5, wherein, in step (vi), the silicate and the medium resulting from the addition of the acidifying agent to the reaction medium are placed in contact in a rapid mixer or in a turbulent flow zone.

10. The process as claimed in claim 6, wherein, in step (vi), the acidifying agent and the silicate are placed in contact with the reaction medium in a rapid mixer or in a turbulent flow zone.

11. The process as claimed in claim 8, wherein the reaction medium obtained in step (vi), in the rapid mixer or in the turbulent flow zone is introduced into the reactor in which step (vii) is performed.

12. The process as claimed in claim 8, wherein, in step (vi), the rapid mixer is selected from the group consisting of symmetrical T or Y mixers or tubes, asymmetric T or Y mixers or tubes, tangential jet mixers, Hartridge-Roughton mixers, vortex mixers and rotor-stator mixers.

13. The process as claimed in claim 8, wherein, in step (vi), a tangential-jet, Hartridge-Roughton or vortex mixer is used.

14. The process as claimed in claim 1, wherein drying is performed by atomization.

15. The process as claimed in claim 1, wherein separating the suspension comprises filtration performed using a filter press or using a vacuum filter.

16. The process as claimed in claim 1 wherein said silica is formed from aggregates of primary particles (A) of silica at the surface of which are primary particles (B) of silica smaller in size than the primary particles (A), the silica having:

- a CTAB specific surface area ($S_{CTAB}$) of between 60 and 400 m$^2$/g,
- a median size d50 of aggregates, measured by XDC granulometry after ultrasound deaggregation, such that:

$$d50 \text{ (nm)} > (6214/S_{CTAB} \text{ (m}^2\text{/g)}) + 23,$$

- a pore volume distribution such that:

$$V_{(d5-d50)}/V_{(d5-d100)} > 0.906 - (0.0013 \cdot S_{CTAB} \text{ (m}^2\text{/g)}), \text{ and}$$

- a pore size distribution (diameters) such that:

$$\text{Mode (nm)} > (4166/S_{CTAB} \text{ (m}^2\text{/g)}) - 9.2.$$

17. The preparation process as claimed in claim 16, said precipitated silica having a parameter C, measured by small-angle X-ray scattering (SAXS), such that: $C/S_{CTAB}$ (m$^2$/g) > 0.001.

18. The preparation process as claimed in claim 16, wherein said precipitated silica is in the form of substantially spherical beads.

* * * * *